(12) United States Patent
Cornelius et al.

(10) Patent No.: US 8,737,521 B2
(45) Date of Patent: May 27, 2014

(54) SIGNAL CONVERSION DURING TRANSMISSION OF SERIAL DATA STREAMS

(75) Inventors: William P. Cornelius, Saratoga, CA (US); Dennis A. Yarak, San Mateo, CA (US)

(73) Assignee: Apple Inc., Cupertino, CA (US)

( * ) Notice: Subject to any disclaimer, the term of this patent is extended or adjusted under 35 U.S.C. 154(b) by 135 days.

(21) Appl. No.: 13/414,471

(22) Filed: Mar. 7, 2012

(65) Prior Publication Data

US 2013/0235921 A1    Sep. 12, 2013

(51) Int. Cl.
*H04L 27/00*    (2006.01)

(52) U.S. Cl.
USPC ......................................................... 375/295

(58) Field of Classification Search
USPC ......... 375/295, 229, 232, 257, 285, 340, 346; 326/83; 370/276
See application file for complete search history.

(56) References Cited

U.S. PATENT DOCUMENTS

| | | | |
|---|---|---|---|
| 2005/0212559 A1* | 9/2005 | Paillet et al. | 326/83 |
| 2006/0277339 A1* | 12/2006 | Sakaki et al. | 710/62 |
| 2010/0246647 A1* | 9/2010 | Maillard et al. | 375/220 |
| 2011/0292708 A1* | 12/2011 | Kang et al. | 365/63 |

* cited by examiner

*Primary Examiner* — Khai Tran
(74) *Attorney, Agent, or Firm* — Park, Vaughan, Fleming & Dowler LLP; Chia-Hsin Suen

(57) ABSTRACT

The disclosed embodiments provide a system that facilitates transmission of a serial data stream. The system may include, in a receiver of the serial data stream, a first mechanism for converting from single-ended signaling to differential signaling, wherein the first mechanism facilitates rejection of common mode noise in the serial data stream. For example, the first mechanism may be a balun and/or a common-mode choke.

19 Claims, 4 Drawing Sheets

SIGNAL CONVERSION DURING TRANSMISSION OF SERIAL DATA STREAMS

BACKGROUND

1. Field

The disclosed embodiments relate to mode conversion of electrical signals. More specifically, the disclosed embodiments relate to techniques for converting between single-ended signaling and differential signaling to transmit serial data streams.

2. Related Art

Single-ended (e.g., coaxial) cables are commonly used to transmit signals among computer systems, peripheral devices, input/output (I/O) devices, and/or other types of electronic devices. During the transmission of a signal along a single-ended cable, noise may be caused by crosstalk, inductive coupling, and/or capacitive coupling on the wire used to transmit the signal and/or a difference in ground voltage between the transmitter and receiver of the signal. Moreover, the receiver's sensitivity to the noise may increase with the data transmission rate between the transmitter and receiver. As a result, noise may produce errors in the signal and preclude effective communication between the transmitter and receiver, particularly in modern, high-bandwidth applications.

On the other hand, differential (e.g., twisted pair) cables may facilitate the removal of noise by transmitting two signals of equal amplitude and opposing polarities on two separate wires. The receiver of the signals may then obtain the transmitted signal as the voltage difference between the two complementary signals. At the same time, noise may be transmitted equally along both wires and subtracted away by the receiver.

Unfortunately, differential cables may be associated with a number of drawbacks. First, the increased number of wires may increase the material costs and diameters of differential cables over those of single-ended cables. Differential cables may also be less flexible and/or more prone to breaking than single-ended cables. Differential wires may further cause differential- to common-mode conversion (e.g., skew between N and P wires) within the twisted pair and/or the opposite conversion, resulting in differential signal degradation. Finally, stripping and soldering of twisted wires during fabrication of differential cables may be performed manually by humans, whereas fabrication of single-ended cables may be automated by machines.

Hence, what is needed is a mechanism for mitigating cost, complexity, size, and/or flexibility issues associated with the manufacture and use of differential cables.

SUMMARY

The disclosed embodiments provide a system that facilitates transmission of a serial data stream. The system may include, in a receiver of the serial data stream, a first mechanism for converting from single-ended signaling to differential signaling, wherein the first mechanism facilitates rejection of common mode noise in the serial data stream. For example, the first mechanism may be a balun and/or a common-mode choke.

In some embodiments, the system also includes, in a transmitter of the serial data stream, a second mechanism for converting from differential signaling to single-ended signaling to transmit the serial data stream to the receiver. The second mechanism may increase the frequency range of the serial data stream.

In some embodiments, the first mechanism also reduces a number of wires in a cable connected to the receiver. For example, the first mechanism may allow the use of single-ended signaling in transmitting the serial data stream from the cable to the receiver. In turn, the single-ended signaling may be performed by a coaxial cable instead of a thicker, more complex, costlier, and/or less bendable twisted pair cable.

In some embodiments, the receiver also includes an equalizer for performing equalization on the serial data stream based on a first frequency loss associated with the cable and a second frequency loss associated with the first mechanism. For example, the equalizer may correspond to a decision feedback equalizer (DFE) that performs linear and/or nonlinear equalization on the serial data stream based on loss of high-frequency content during transmission of the serial data stream over the cable cascaded with additional high-frequency loss from the operation of the first mechanism in converting the serial data stream from single-ended signaling to differential signaling.

In some embodiments, the receiver further includes a printed circuit board (PCB) and a die on the PCB, and the first mechanism converts from single-ended signaling to differential signaling before the serial data stream reaches the die on the PCB. In other words, differential signaling may be performed on the reference plane transition between the PCB and the die to enable rejection of common mode noise in the serial data stream at the die.

In some embodiments, the serial data stream corresponds to a pseudorandom bit sequence (PRBS). In addition, the PRBS may be associated with a frequency range of between about 140 MHz to about 5 GHz. For example, the PRBS may be transmitted over a high-speed interface between a computer system and an input/output (I/O) device, peripheral device, and/or other electronic device.

BRIEF DESCRIPTION OF THE FIGURES

In the figures, like reference numerals refer to the same figure elements.

DETAILED DESCRIPTION

The following description is presented to enable any person skilled in the art to make and use the embodiments, and is provided in the context of a particular application and its requirements. Various modifications to the disclosed embodiments will be readily apparent to those skilled in the art, and the general principles defined herein may be applied to other embodiments and applications without departing from the spirit and scope of the present disclosure. Thus, the present invention is not limited to the embodiments shown, but is to be accorded the widest scope consistent with the principles and features disclosed herein.

The data structures and code described in this detailed description are typically stored on a computer-readable storage medium, which may be any device or medium that can store code and/or data for use by a computer system. The computer-readable storage medium includes, but is not limited to, volatile memory, non-volatile memory, magnetic and optical storage devices such as disk drives, magnetic tape, CDs (compact discs), DVDs (digital versatile discs or digital video discs), or other media capable of storing code and/or data now known or later developed.

The methods and processes described in the detailed description section can be embodied as code and/or data, which can be stored in a computer-readable storage medium as described above. When a computer system reads and executes the code and/or data stored on the computer-readable storage medium, the computer system performs the methods and processes embodied as data structures and code and stored within the computer-readable storage medium.

Furthermore, methods and processes described herein can be included in hardware modules or apparatus. These modules or apparatus may include, but are not limited to, an application-specific integrated circuit (ASIC) chip, a field-programmable gate array (FPGA), a dedicated or shared processor that executes a particular software module or a piece of code at a particular time, and/or other programmable-logic devices now known or later developed. When the hardware modules or apparatus are activated, they perform the methods and processes included within them.

The disclosed embodiments provide a method and system for facilitating the transmission of a serial data stream over a cable. The serial data stream may correspond to a pseudorandom bit sequence (PRBS) with a frequency range of between about 140 MHz to about 5 GHz. For example, the serial data stream may be transmitted over a high-speed interface between a computer system and an input/output (I/O) device, peripheral device, and/or other electronic device.

Figure 1:
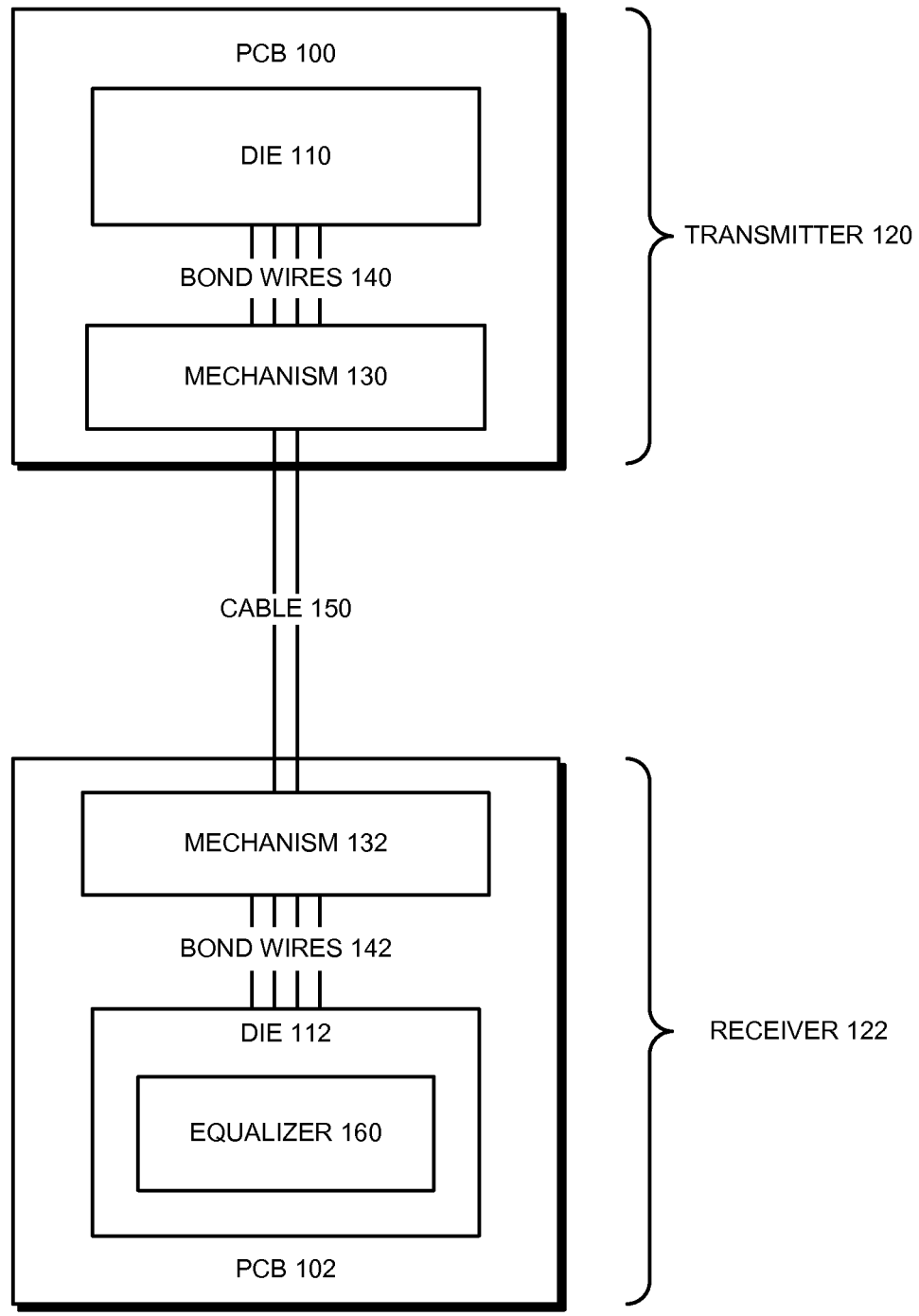
FIG. 1 shows a schematic of a system in accordance with the disclosed embodiments.

More specifically, the disclosed embodiments provide a method and system for facilitating rejection of common mode noise in the serial data stream while also reducing the number of wires in the cable. As shown in FIG. 1, the serial data stream may be generated by a die 110 (e.g., processor) on a printed circuit board (PCB) 100 of a computer system, peripheral device, input/output (I/O) device, and/or other electronic device. The serial data stream may be transmitted from die 110 along a set of bond wires 140 to PCB 100, then over a cable 150 to a PCB 102 of a different electronic device and along another set of bond wires 142 from PCB 102 to a different die 112 on PCB 102. In other words, die 100 and PCB 100 may correspond to a transmitter 120 of the serial data stream, and die 112 and PCB 102 may correspond to a receiver 122 of the serial data stream.

Those skilled in the art will appreciate that transmission of the serial data stream along cable 150 may be associated with a tradeoff between noise immunity and complexity. In particular, differential signaling between transmitter 120 and receiver 122 may provide immunity to common mode noise at the expense of increased cost, complexity, and/or size. For example, twisted pair cable may provide differential signaling that enables the removal of common mode noise from the serial data stream, even at high speeds. However, the twisted pair cable may be thicker, more expensive, less flexible, and/or more prone to breaking than single-ended coaxial cable. Similarly, attachment of the twisted pair cable to PCB 100 and/or PCB 102 may require multiple manual steps, whereas attachment of coaxial cable to PCB 100 and/or PCB 102 may be automated. Finally, differential wires may cause differential- to common-mode conversion within twisted pair cables, resulting in differential signal degradation.

In one or more embodiments, the system of FIG. 1 includes functionality to reduce the size, cost, and/or complexity of cable 150 while also mitigating the effects of common mode noise during differential transmission of the serial data stream along bond wires 140-142. As shown in FIG. 1, receiver 122 may include a mechanism 132 for converting from single-ended signaling to differential signaling. Moreover, mechanism 132 may correspond to a balun, common-mode choke, and/or other circuit for facilitating rejection of common mode noise in the serial data stream. In other words, mechanism 132 may convert from single-ended signaling to differential signaling before the serial data stream reaches die 112, thus reducing noise and/or crosstalk as the serial data stream is transmitted along bond wires 142 to die 112.

An equalizer 160 in receiver 122 and/or die 112 may also perform equalization on the serial data stream based on a first frequency loss associated with cable 150 and a second frequency loss associated with mechanism 132. For example, equalizer 160 may correspond to a decision feedback equalizer (DFE) that performs nonlinear equalization on the serial data stream based on loss of high-frequency content during transmission of the serial data stream over cable 150 cascaded with additional high-frequency loss from the operation of mechanism 132 in converting the serial data stream from single-ended signaling to differential signaling.

To improve the frequency range of the serial data stream, transmitter 120 may also include a mechanism 130 for converting from differential signaling to single-ended signaling to transmit the serial data stream. Alternatively, mechanism 130 may be omitted from transmitter 120, and single-ended signaling along cable 150 may be implemented by terminating (e.g., with 50 ohms to ground) one of the signals from each pair used in differential transmission of the serial data stream, as discussed in further detail below with respect to FIGS. 2-3.

As a result, transmission of the serial data stream may be differential on reference plane transitions between dies 110-112 and PCBs 100-102 (e.g., bond wires 140-142) to enable rejection of common mode noise in the serial data stream at dies 110-112 and single-ended along cable 150 to simplify transmission of the serial data stream between transmitter 120 and receiver 122. For example, the system of FIG. 1 may allow thinner, more flexible, and/or cheaper coaxial cable 150 to be installed and used between transmitter 120 and receiver 122 instead of thicker, less flexible, and/or more expensive twisted pair cable. The system of FIG. 1 may further mitigate mode conversion artifacts associated with differential signaling along cable 150, such as skew and/or delay between pairs of inner conductors in twisted pair cable.

Figure 2:
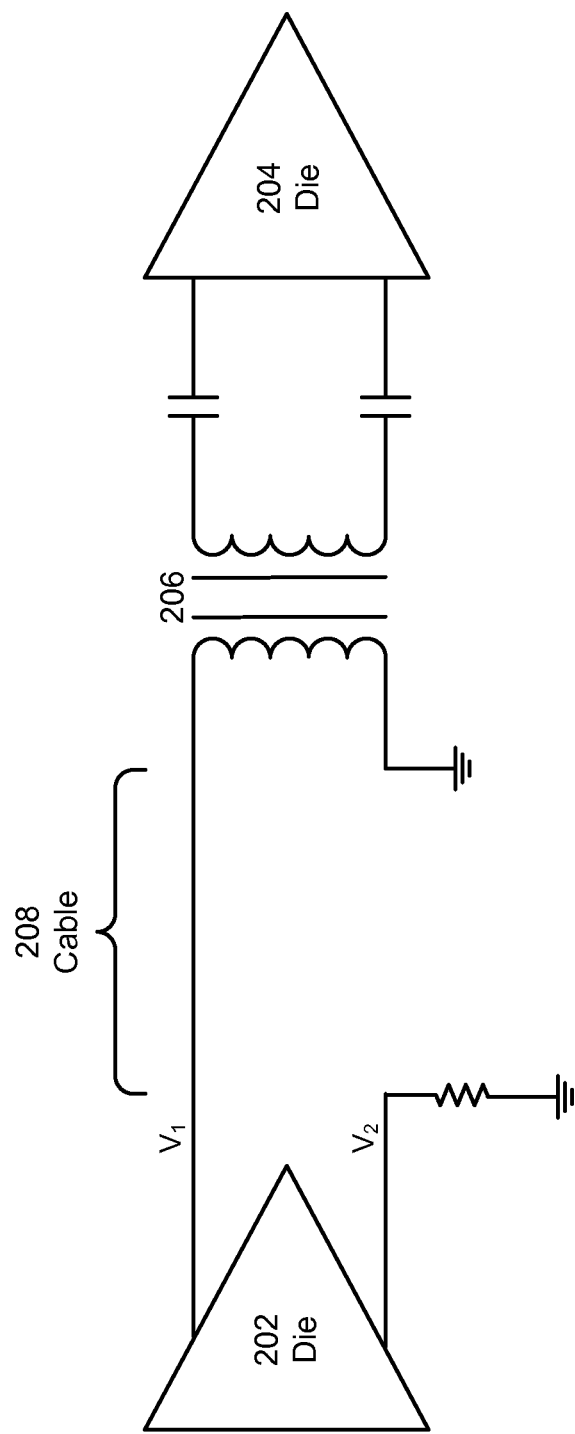
FIG. 2 shows a system for facilitating transmission of a serial data stream in accordance with the disclosed embodiments.

FIG. 2 shows a system for facilitating transmission of a serial data stream in accordance with the disclosed embodiments. The serial data stream may be generated by a die 202 on a PCB and transmitted differentially along two wires as two complementary voltages "$V_1$" and "$V_2$." In addition, the voltages may be of equal amplitude and opposing polarities (e.g., $V_1 = -V_2$).

To enable the use of single-ended signaling in transmitting the serial data stream along a cable 208, the "$V_2$" signal is terminated to ground (e.g., with 50 ohms) before cable 208, and only the "$V_1$" signal is transmitted along cable 208 to reduce the number of wires in cable 208. In turn, cable 208 may correspond to a cheaper, thinner, and/or more flexible coaxial cable instead of a costlier, thicker, and/or less flexible twisted pair cable. Single-ended signaling along cable 208 may further preclude skew and/or timing issues associated with mode conversion along differential cables.

A balun 206 may then convert from single-ended signaling to differential signaling to transmit the serial data stream before the serial data stream reaches a die 204 on a second PCB. Such conversion to differential signaling may provide immunity to common mode noise as the serial data stream is transmitted to die 204 (e.g., along bond wires from the second PCB).

Figure 3:
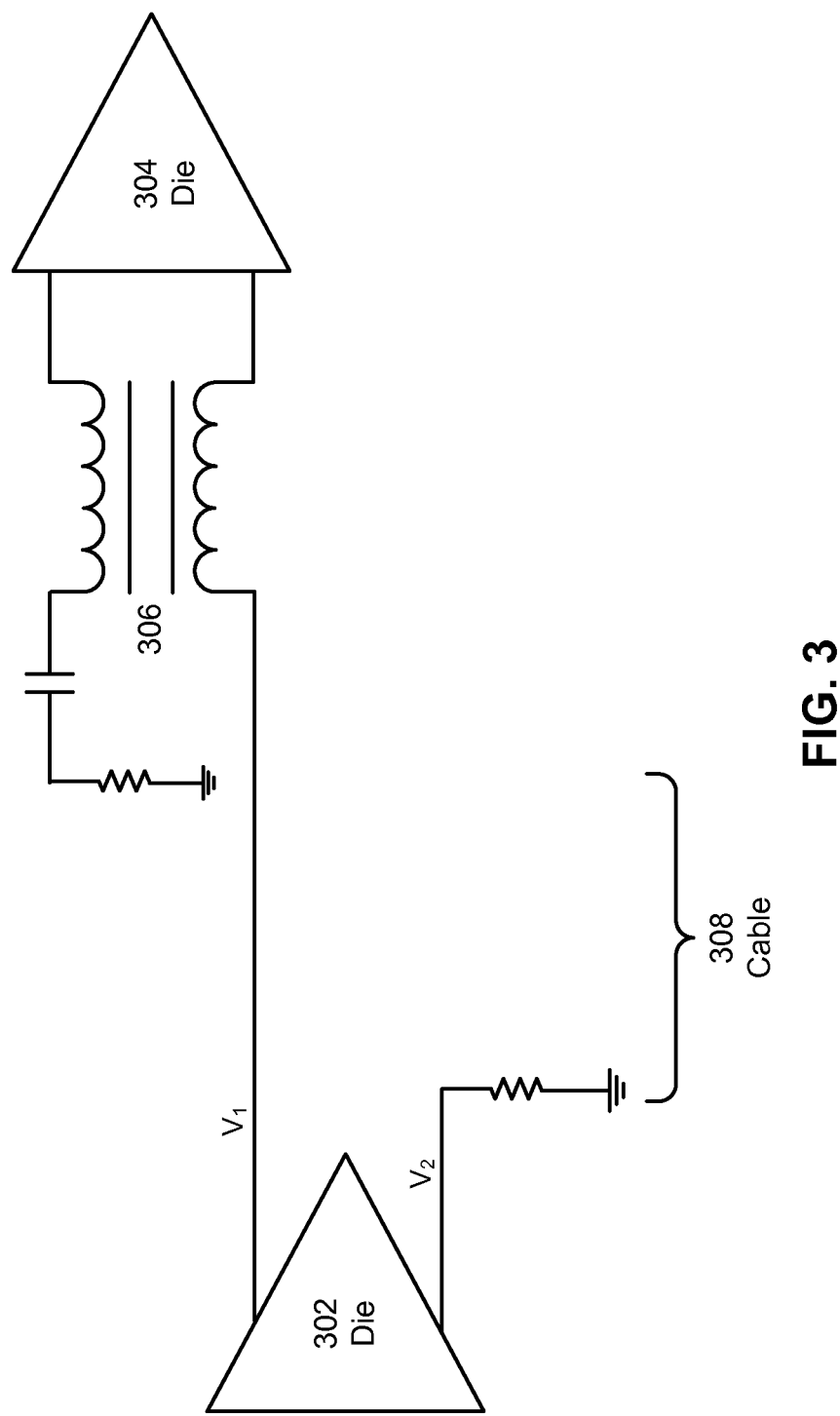
FIG. 3 shows a system for facilitating transmission of a serial data stream in accordance with the disclosed embodiments.

FIG. 3 shows a system for facilitating transmission of a serial data stream in accordance with the disclosed embodiments. As with the system of FIG. 2, the system of FIG. 3 includes a die 302 on a PCB that transmits a serial data stream differentially along two wires as two complementary voltages "$V_1$" and "$V_2$." In addition, the "$V_2$" signal may be terminated to enable single-ended signaling in transmitting the serial data stream along a cable 308.

A common-mode choke 306 may then convert from single-ended signaling to differential signaling before the serial data stream reaches a die 304 on a second PCB. Like balun 206 of FIG. 2, common-mode choke 306 may enable rejection of common mode noise in the serial data stream. Common-mode choke 306 may thus reduce the number of wires in cable 308, as well as crosstalk and/or common mode noise along a reference plane transition from the second PCB to die 304.

Figure 4:
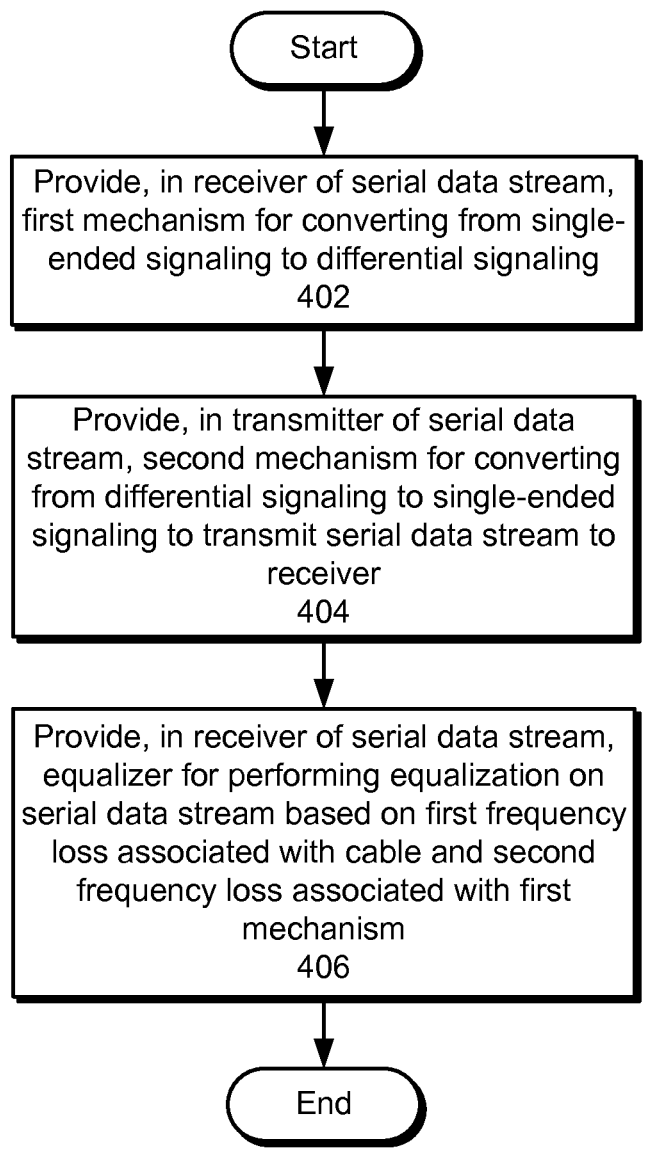
FIG. 4 shows a flowchart illustrating the process of facilitating transmission of a serial data stream in accordance with the disclosed embodiments.

FIG. 4 shows a flowchart illustrating the process of facilitating transmission of a serial data stream in accordance with the disclosed embodiments. In one or more embodiments, one or more of the steps may be omitted, repeated, and/or performed in a different order. Accordingly, the specific arrangement of steps shown in FIG. 4 should not be construed as limiting the scope of the embodiments.

Initially, a first mechanism for converting from single-ended signaling to differential signaling is provided in a receiver of the serial data stream (operation 402). The serial data stream may correspond to a PRBS with a frequency range of between about 140 MHz to about 5 GHz. The first mechanism may correspond to a balun, common-mode choke, and/or other circuit for facilitating rejection of common mode noise in the serial data stream. The first mechanism may additionally reduce the number of wires in a cable connected to the receiver. For example, the first mechanism may halve the number of wires required to transmit the serial data stream along the cable.

Next, a second mechanism for converting from differential signaling to single-ended signaling to transmit the serial data stream to the receiver is provided in a transmitter of the serial data stream (operation 404). The second mechanism may boost the frequency range of the serial data stream and/or enable use of single-ended signaling along the length of the cable. Alternatively, the second mechanism may be omitted, and single-ended signaling in the cable may be performed by terminating one side of the differential signaling with 50 ohms to ground. The first and/or second mechanisms may thus reduce the cost, complexity, size, and/or fragility of the cable while mitigating mode conversion artifacts associated with differential signaling along the cable.

Finally, an equalizer for performing equalization on the serial data stream based on a first frequency loss associated with the cable and a second frequency loss associated with the first mechanism is provided in the receiver of the serial data stream (operation 406). For example, the equalizer may perform linear and/or nonlinear equalization on the serial data stream based on the loss of high-frequency content during transmission of the serial data stream over the cable cascaded with additional high-frequency loss from the operation of the first mechanism in converting the serial data stream from single-ended signaling to differential signaling.

The foregoing descriptions of various embodiments have been presented only for purposes of illustration and description. They are not intended to be exhaustive or to limit the present invention to the forms disclosed. Accordingly, many modifications and variations will be apparent to practitioners skilled in the art. Additionally, the above disclosure is not intended to limit the present invention.

What is claimed is:

1. A system for facilitating transmission of a serial data stream, comprising:
    a receiver of the serial data stream, comprising:
        a first mechanism for converting from single-ended signaling to differential signaling, wherein the first mechanism facilitates rejection of common mode noise in the serial data stream and wherein the first mechanism is at least one of a balun and a common-mode choke.

2. The system of claim 1, further comprising:
    a transmitter of the serial data stream, comprising:
        a second mechanism for converting from differential signaling to single-ended signaling to transmit the serial data stream to the receiver.

3. The system of claim 1, wherein the first mechanism further reduces a number of wires in a cable connected to the receiver.

4. The system of claim 3, wherein the cable is a coaxial cable.

5. The system of claim 3, wherein the single-ended signaling is used to transmit the serial data stream through the cable.

6. The system of claim 3, wherein the receiver further comprises:
    an equalizer for performing equalization on the serial data stream based on a first frequency loss associated with the cable and a second frequency loss associated with the first mechanism.

7. The system of claim 1, wherein the receiver further comprises:
    a printed circuit board (PCB); and
    a die on the PCB,
    wherein the first mechanism converts from single-ended signaling to differential signaling before the serial data stream reaches the die on the PCB.

8. The system of claim 1, wherein the serial data stream corresponds to a pseudorandom bit sequence (PRBS).

9. The system of claim 8, wherein the PRBS is associated with a frequency range of between about 140 MHz to about 5 GHz.

10. A method for facilitating transmission of a serial data stream, comprising:
    providing, in a receiver of the serial data stream, a first mechanism for converting from single-ended signaling to differential signaling to transmit the serial data stream, wherein the first mechanism facilitates rejection of common mode noise in the serial data stream and wherein the first mechanism is at least one of a balun and a common-mode choke.

11. The method of claim 10, further comprising:
    providing, in a transmitter of the serial data stream, a second mechanism for converting from differential signaling to single-ended signaling to transmit the serial data stream to the receiver.

12. The method of claim 10, wherein the first mechanism further reduces a number of wires in a cable connected to the receiver.

13. The method of claim 12, wherein the cable is a coaxial cable.

14. The method of claim 12, wherein the single-ended signaling is used to transmit the serial data stream through the cable.

15. The method of claim 12, further comprising:
providing, in the receiver of the serial data stream, an equalizer for performing equalization on the serial data stream based on a first frequency loss associated with the cable and a second frequency loss associated with the first mechanism.

16. The method of claim 10, wherein the receiver further comprises:
a printed circuit board (PCB); and
a die on the PCB,
wherein the first mechanism converts from single-ended signaling to differential signaling before the serial data stream reaches the die on the PCB.

17. The method of claim 10, wherein the serial data stream corresponds to a pseudorandom bit sequence (PRBS).

18. The method of claim 17, wherein the PRBS is associated with a frequency range of between about 140 MHz to about 5 GHz.

19. A system for facilitating transmission of a serial data stream, comprising:
a receiver of the serial data stream, comprising:
a first mechanism for converting from single-ended signaling to differential signaling, wherein the first mechanism facilitates rejection of common mode noise in the serial data stream and reduces a number of wires in a cable connected to the receiver; and
an equalizer for performing equalization on the serial data stream based on a first frequency loss associated with the cable and a second frequency loss associated with the first mechanism.

* * * * *